United States Patent
Gu et al.

(10) Patent No.: US 9,882,889 B1
(45) Date of Patent: Jan. 30, 2018

(54) TECHNIQUES FOR USER AUTHENTICATION

(71) Applicant: Symantec Corporation, Mountain View, CA (US)

(72) Inventors: Lei Gu, Bedford, MA (US); Ilya Sokolov, Boston, MA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/754,414

(22) Filed: Jun. 29, 2015

(51) Int. Cl.
  *H04L 29/06* (2006.01)
(52) U.S. Cl.
  CPC ........ *H04L 63/0823* (2013.01); *H04L 63/064* (2013.01); *H04L 63/083* (2013.01)
(58) Field of Classification Search
  CPC .... H04L 63/0823; H04L 63/64; H04L 63/083
  See application file for complete search history.

(56) References Cited

U.S. PATENT DOCUMENTS

| | | | | |
|---|---|---|---|---|
| 2007/0283447 A1* | 12/2007 | Hong | ...................... | G06F 21/34 726/28 |
| 2009/0165125 A1* | 6/2009 | Brown | .................... | G06F 21/31 726/21 |
| 2010/0066487 A1* | 3/2010 | Bell | ........................ | B60R 25/00 340/5.6 |
| 2010/0278438 A1* | 11/2010 | Thompson | ............... | G06K 9/48 382/209 |
| 2011/0088083 A1* | 4/2011 | Ficko | ....................... | G06F 21/34 726/5 |
| 2012/0278241 A1* | 11/2012 | Brown | .................... | G06F 21/32 705/67 |
| 2014/0113683 A1* | 4/2014 | Hickey | .................... | G06K 9/00 455/556.1 |
| 2014/0314508 A1* | 10/2014 | Seriff | .................... | G06K 9/4685 409/81 |

(Continued)

OTHER PUBLICATIONS

Itthisupornrat et al, Duplicate a blank key using image processing, SICE-ICASE, 2006. International Joint Conference, Feb. 2007, p. 5715-5718.*

(Continued)

*Primary Examiner* — Luu Pham
*Assistant Examiner* — Harvey Cohen
(74) *Attorney, Agent, or Firm* — Rory D. Rankin; Meyertons, Hood, Kivlin, Kowert & Goetzel, P.C.

(57) ABSTRACT

Techniques for user authentication are disclosed. In one embodiment, the techniques may be realized as a method including during registration of a user, receiving a first captured image of a physical key having a blade; identifying from the captured image a plurality of features associated with the blade of the physical key; associating the identified plurality of features with the user as key feature data; in response to a subsequent access request by the user requiring authorization of the user, prompting the user to present the physical key; receiving a second captured image in response to prompting the user; analyzing the second image to determine if the key feature data is represented in the second image; and in response to determining that the key feature data is represented in the second image, authorizing the user's access request.

16 Claims, 4 Drawing Sheets

(56) References Cited

U.S. PATENT DOCUMENTS

2015/0026785 A1* 1/2015 Soon-Shiong ..... G06Q 30/0207
726/7
2015/0199801 A1* 7/2015 Day ........................ G06K 9/48
382/152

OTHER PUBLICATIONS

Laxton et al, Reconsidering physical key secrecy: teleduplication via optical decoding, ACM, Proceedings of the 15th ACM conference on Computer and communications security, Oct. 2008, pp. 469-478.*

* cited by examiner

TECHNIQUES FOR USER AUTHENTICATION

FIELD OF THE DISCLOSURE

The present disclosure relates generally to system security and, more specifically, to techniques for user authentication.

BACKGROUND OF THE DISCLOSURE

More and more, user personal private data migrates to the cloud. For example, photos may be stored on file sharing sites. A user's credit card and account info may be stored in online vaults associated with various security programs. Personal emails are often stored in cloud mail boxes. A user is typically required to log into cloud accounts using a username and password.

Unfortunately, usernames and passwords are prone to phishing attacks and other potential security breaches. Many people pick their passwords using identifiable personal information that can be easily obtained through public search, thus allowing third parties to compromise a user's account. Also, a user often uses the same password across multiple cloud accounts, so in compromising the least secure cloud service account, more secure and high-valued accounts can also be compromised.

Certain methods of multi-factor authentication have been introduced in an attempt to address the above issues, but these types of solutions usually require specialized devices that the user has to maintain and keep track of. Currently, there is no good mechanism for authenticating a user in the cloud that is secure, is intuitive to use, and relies on a non-digital device that the user already possesses.

In view of the foregoing, it may be understood that there may be significant problems and shortcomings associated with existing authentication methods.

SUMMARY OF THE DISCLOSURE

Techniques for user authentication are disclosed. In one embodiment, the techniques may be realized as a method including during registration of a user, receiving a first captured image of a physical key having a blade; identifying from the captured image a plurality of features associated with the blade of the physical key; associating the identified plurality of features with the user as key feature data; in response to a subsequent access request by the user requiring authorization of the user, prompting the user to present the physical key; receiving a second captured image in response to prompting the user; analyzing the second image to determine if the key feature data is represented in the second image; and in response to determining that the key feature data is represented in the second image, authorizing the user's access request.

In accordance with other aspects of this embodiment, analyzing the second image includes applying at least one image processing technique to the second image in order to accommodate differences between the first and second images.

In accordance with other aspects of this embodiment, at least one additional authorization vector can be required to authorize the user's access request in addition to presenting the physical key.

In accordance with other aspects of this embodiment, the user can prompted to present the physical key after the user fails another authorization vector. The user can prompted to present the physical key after the user submits that the user has forgotten a password associated with the user, or after the user submits that the user has forgotten to bring a device used to electronically authorize the user.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

In accordance with other aspects of this embodiment, the system can further comprise a video recording device configured to capture the first and second images.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

During registration, an authentication system receives an image of a physical key from a user. The system extracts various features of the blade of the key and securely associates the key features with the user.

Subsequently, the system can require the user to present the key to an imaging device as a user authentication method. Features of the key blade are extracted from the submitted image and compared to the features securely associated with the user. Authentication is confirmed if the features match.

Figure 1:
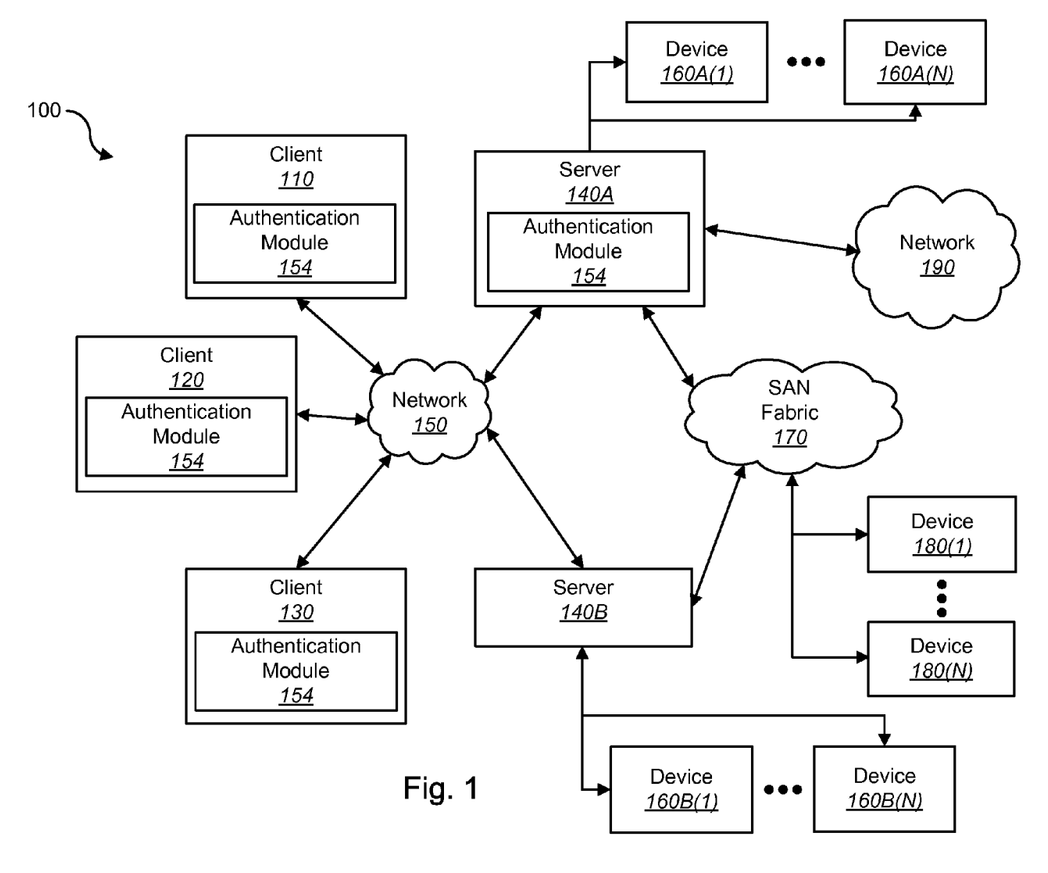
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
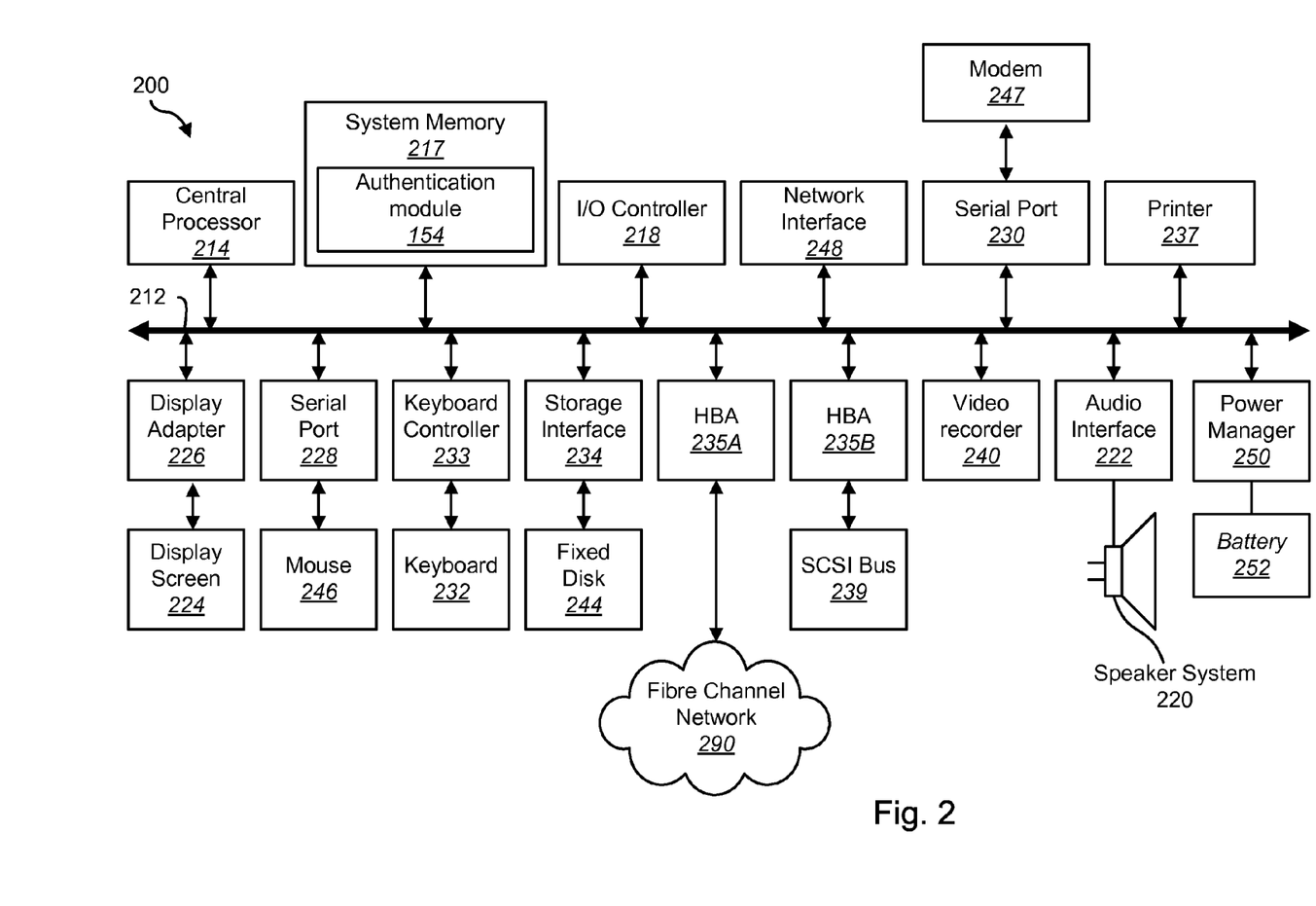
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of system security such as, for example, authentication module 154. Further, one or more portions of the authentication module 154 may reside at a network centric location, such as server 140A and/or server 140B. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, secure management of system access and availability of resources including the authentication module 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a printer 237 operative to receive data and/or images for printing, a host bus adapter (HBA) interface card 235A operative to connect with a Fibre Channel network 290 and a host bus adapter (HBA) interface card 235B operative to connect to a SCSI bus 239. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252. A video recorder 240 may allow for capture of still images and/or moving video data.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a printer 237, a removable disk unit (e.g., Universal Serial Bus drive), or other storage medium. According to some embodiments, authentication module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244 or optical disk 242. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
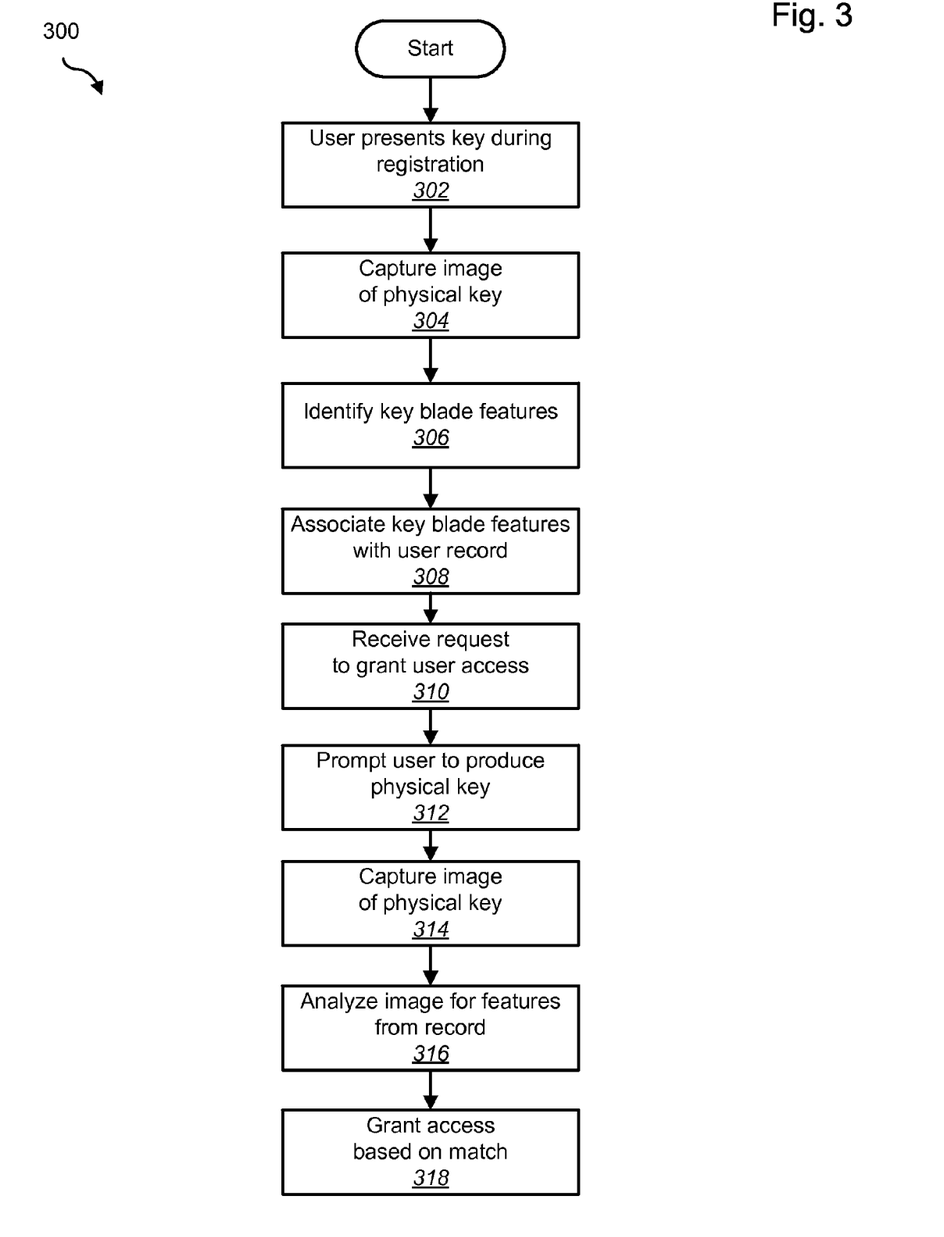
FIG. 3 shows a method for authentication in accordance with an embodiment of the present disclosure.

FIG. 3 is a flowchart illustrating a method 300 for user authentication in accordance with the present disclosure.

As part of registering for authorization, a user presents a physical key having a shaped blade designed for use in a physical lock (302). An image is captured of the physical key (304), such as by means of a recording device associated with the user's client device, and a plurality of blade features are identified from the image (306).

Figure 4:
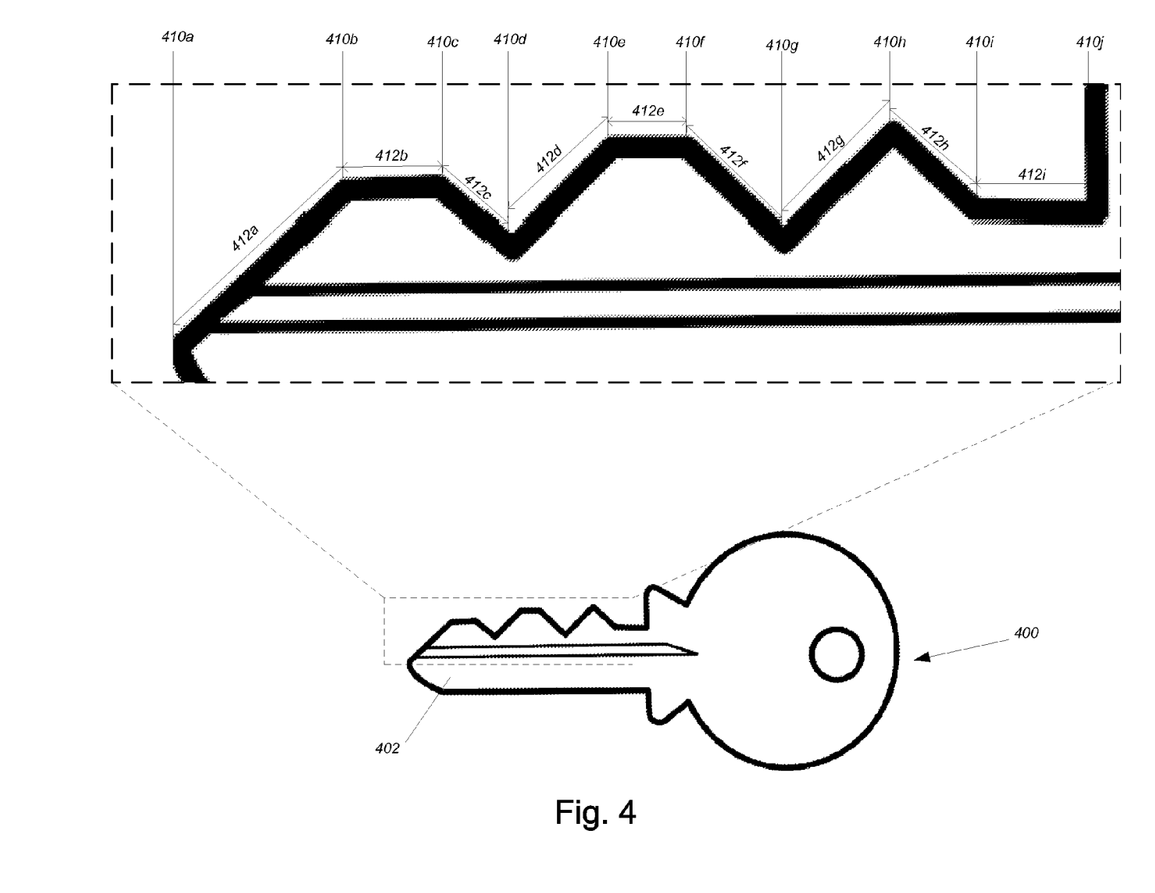
FIG. 4 illustrates a key blade with identifiable features in accordance with an embodiment of the present disclosure.

FIG. 4 illustrates an example of a key 400 with a blade 402 including features which can be identified and used for authentication as described. For example, in one implementation, the length and angle of each straight region 412 of the blade between each corner 410 can be recorded. In some implementations, the distance between each corner 410 can be recorded disregarding the angles of the straight regions 412. In some implementations, only a portion of the blade features may be considered; for instance, starting from the tip 410*a*, the length and angles of the first four straight regions 412*a*, 412*b*, 412*c*, and 412*d* can be recorded but not the remaining regions 412*e-i*. Similarly, corners representing local maxima such as 410*b*, 410*c*, 410*e*, 410*f*, and 410*h* might be recorded but not corners representing local minima such as 410*a*, 410*d*, 410*g*, and 410*i*. Various image compression techniques for storing edge data are known and may be used by one skilled in the art to reduce the key blade features to an appropriate data set.

The identified features are associated with the user (308). However the features are identified and in whatever format they are stored, the resulting key data may be further processed in order to be securely stored as authentication data, including whatever security procedures are in place for passwords, answers to security questions, personally identifying information, and the like. The information may be encrypted and stored in a secure location as appropriate.

Subsequently, the system may receive a request to grant the same user access (310). It will be understood that the following procedures involving the key information may in some implementations be used routinely as part of system access, and in other implementations the key information may be used as a secondary process when further authentication is required or necessary (such as when primary credentials such as a password are forgotten by a user or have been input incorrectly, when a user has forgotten an electronic keycard or other device used for authentication, or for access to particular system resources which are deemed to require heightened security).

In response to the access request, the system prompts the user to produce their physical key for authorization (312). Presumably, this involves the use of a video recording device in order to capture an image of the key (314). In some implementations, an authorization module responsible for assuring these authentication steps may take direct control of a recording device to assure that the resulting image is captured concurrent with the request and not a recycled, older image captured at an earlier time. Other safeguards may be put in place to assure the authenticity of the image.

The newly submitted image is then examined to determine if it includes features that match the features associated with the user's record (316). Various image processing techniques may be used to account for the fact that the orientation and facing of the present image may be different from that of the original registration image; for instance, the key may be "flipped over" such that the blade features are mirrored to what they were. Similarly, the key may be held at a slight angle or at a different distance from the video recorder, which could change any length or angle measurements of the features in predictable ways. Variations in lighting may also pose a challenge. In some implementations, a user may be asked to adjust the position of the key relative to the video recorder in some way before capturing another image due to concerns regarding the clarity of the received image.

If the key matches, then the user is authenticated (318). It will be understood that this may be only one of multiple vectors used at a given time to authenticate the user, and that its use may be modified to accommodate available resources and previous or subsequent additional authentication vectors.

One of ordinary skill will recognize opportunities to include the physical key as one of a number of available authentication tools. For example, security devices exist that periodically present the user with a unique authentication code based both on a commonly seeded value and a window of time, such that the authentication code changes over time.

Typically, if a user loses or breaks the device, new device with a new seed must be generated and the system reset to accommodate the new seed. However, in some implementations, the seeded value could be based on a numeric representation of the user's key blade features (using numbers to represent lengths, angles, and corners as illustrated above). In this case, a new device could be created using the same seed by the user producing the key. Similar opportunities may be available with other encoding schemes and multi-factor authentication environments as known in the art.

At this point it should be noted that techniques for user authentication in accordance with the present disclosure as described above may involve the processing of input data and the generation of output data to some extent. This input data processing and output data generation may be implemented in hardware or software. For example, specific electronic components may be employed in authentication modules or similar or related circuitry for implementing the functions associated with user authentication in accordance with the present disclosure as described above. Alternatively, one or more processors operating in accordance with instructions may implement the functions associated with user authentication in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
   during registration of a user, receiving a first captured image of a physical key having a blade;
   identifying from the captured image a plurality of features associated with the blade of the physical key, wherein the plurality of features comprise at least one of:
      a plurality of distances between each corner of the blade while disregarding angles of straight regions of the blade; or
      a first plurality of corners representing local maxima of the blade while disregarding a second plurality of corners representing local minima of the blade;
   associating the identified plurality of features with the user as key feature data;
   in response to a subsequent access request by the user requiring authorization of the user, prompting the user to present the physical key;
   receiving a second captured image in response to prompting the user;
   analyzing the second image to determine if the key feature data is represented in the second image,
      wherein analyzing the second image includes applying at least one image comparison to the second image to accommodate differences between the first and second images,
      wherein the differences between the first and second images comprise at least one of: key orientation, distance, and lighting; and
   in response to determining that the key feature data is represented in the second image, authorizing the access request of the user.

2. The method of claim 1, wherein at least one additional authorization vector is required to authorize the access request of the user in addition to presenting the physical key.

3. The method of claim 1, wherein the user is prompted to present the physical key after the user fails another authorization vector.

4. The method of claim 3, wherein the user is prompted to present the physical key after the user submits that the user has forgotten a password associated with the user.

5. The method of claim 3, wherein the user is prompted to present the physical key after the user submits that the user has forgotten to bring a device used to electronically authorize the user.

6. An article of manufacture comprising:
   at least one non-transitory processor readable storage medium; and instructions stored on the at least one medium;
   wherein the instructions are configured to be readable from the at least one medium by at least one processor and thereby cause the at least one processor to operate so as to:
      during registration of a user, receive a first captured image of a physical key having a blade;
      identify from the captured image a plurality of features associated with the blade of the physical key, wherein the plurality of features comprise at least one of:
         a plurality of distances between each corner of the blade while disregarding angles of straight regions of the blade; or
         a first plurality of corners representing local maxima of the blade while disregarding a second plurality of corners representing local minima of the blade;
      associate the identified plurality of features with the user as key feature data;
      in response to a subsequent access request by the user requiring authorization of the user, prompt the user to present the physical key;
      receive a second captured image in response to prompting the user;
      analyze the second image to determine if the key feature data is represented in the second image,
         wherein analyzing the second image includes applying at least one image comparison to the second image to accommodate differences between the first and second images,
         wherein the differences between the first and second images comprise at least one of: key orientation, distance, and lighting; and
      in response to determining that the key feature data is represented in the second image, authorize the access request of the user.

7. The article of claim 6, wherein at least one additional authorization vector is required to authorize the access request of the user in addition to presenting the physical key.

8. The article of claim 6, wherein the user is prompted to present the physical key after the user fails another authorization vector.

9. The article of claim 8, wherein the user is prompted to present the physical key after the user submits that the user has forgotten a password associated with the user.

10. The article of claim 8, wherein the user is prompted to present the physical key after the user submits that the user has forgotten to bring a device used to electronically authorize the user.

11. A system comprising: at least memory device; and one or more processors communicatively coupled to the at least one memory device;
wherein the one or more processors are configured to:
during registration of a user, receive a first captured image of a physical key having a blade;
identify from the captured image a plurality of features associated with the blade of the physical key, wherein the plurality of features comprise at least one of:
a plurality of distances between each corner of the blade while disregarding angles of straight regions of the blade; or
a first plurality of corners representing local maxima of the blade while disregarding a second plurality of corners representing local minima of the blade;
associate the identified plurality of features with the user as key feature data;
in response to a subsequent access request by the user requiring authorization of the user, prompt the user to present the physical key;
receive a second captured image in response to prompting the user;
analyze the second image to determine if the key feature data is represented in the second image,
wherein analyzing the second image includes applying at least one image comparison to the second image to accommodate differences between the first and second images,
wherein the differences between the first and second images comprise at least one of: key orientation, distance, and lighting; and
in response to determining that the key feature data is represented in the second image, authorize the access request of the user.

12. The system of claim 11, wherein at least one additional authorization vector is required to authorize the access request of the user in addition to presenting the physical key.

13. The system of claim 11, wherein the user is prompted to present the physical key after the user fails another authorization vector.

14. The system of claim 13, wherein the user is prompted to present the physical key after the user submits that the user has forgotten a password associated with the user.

15. The system of claim 13, wherein the user is prompted to present the physical key after the user submits that the user has forgotten to bring a device used to electronically authorize the user.

16. The system of claim 11, further comprising a video recording device configured to capture the first and second images.

* * * * *